A. N. WEIDENBACH.
EGG CASE MACHINE.
APPLICATION FILED AUG. 31, 1917.

1,260,107.

Patented Mar. 19, 1918.
2 SHEETS—SHEET 1.

WITNESSES

INVENTOR
A. N. Weidenbach
BY Victor J. Evans
ATTORNEY

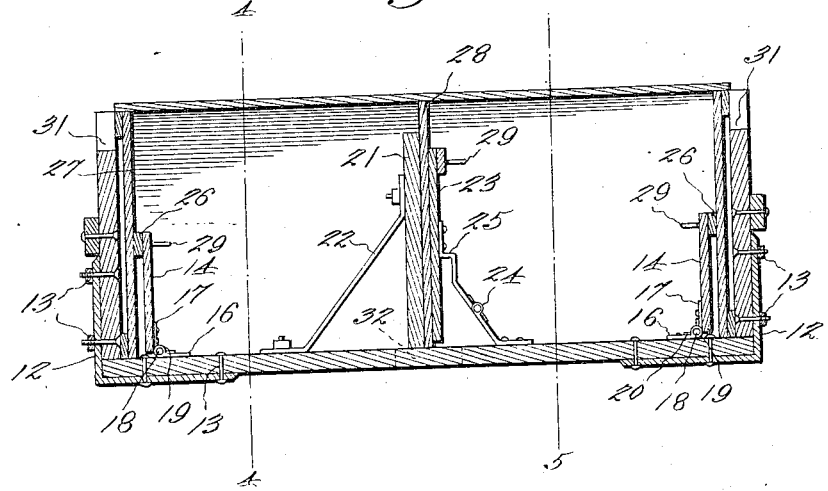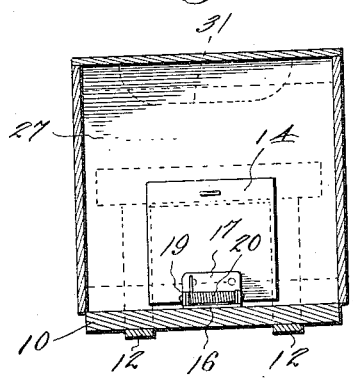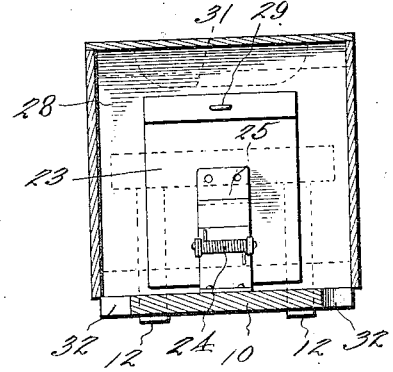

UNITED STATES PATENT OFFICE.

ANDREW N. WEIDENBACH, OF BRIDGEWATER, SOUTH DAKOTA.

EGG-CASE MACHINE.

1,260,107.

Specification of Letters Patent.

Patented Mar. 19, 1918.

Application filed August 31, 1917. Serial No. 189,180.

*To all whom it may concern:*

Be it known that I, ANDREW N. WEIDENBACH, a citizen of the United States, residing at Bridgewater, in the county of McCook and State of South Dakota, have invented new and useful Improvements in Egg-Case Machines, of which the following is a specification.

This invention relates to box making machines and has particular reference to that class of machine designed for the manufacture of egg crates.

The primary object of the invention is to provide means for removably holding the ends and center pieces of the crate in position, suitable spaces apart and alined for the purpose of conveniently attaching the sides and bottom of the crate thereto, the crate in its finished condition being readily removed from the machine for the purpose of placing therein new material.

To this end the invention provides a novel means for yieldingly holding the end and center pieces of the crate in position, the yielding means providing for automatically gripping the said pieces, so that it is unnecessary to adjust the clamps, thereby facilitating the insertion of the material and the removal of the finished crate.

With these and other objects in view, the invention consists of the following novel combination and arrangement of parts, hereinafter more fully described and illustrated in the accompanying drawings, in which—

Fig. 3 is a central longitudinal sectional view of the machine with the finished crate in position.

Fig. 4 is a transverse sectional view on the line 4—4 of Fig. 3.

Fig. 5 is a similar view on the line 5—5 of Fig. 3.

Figure 1:
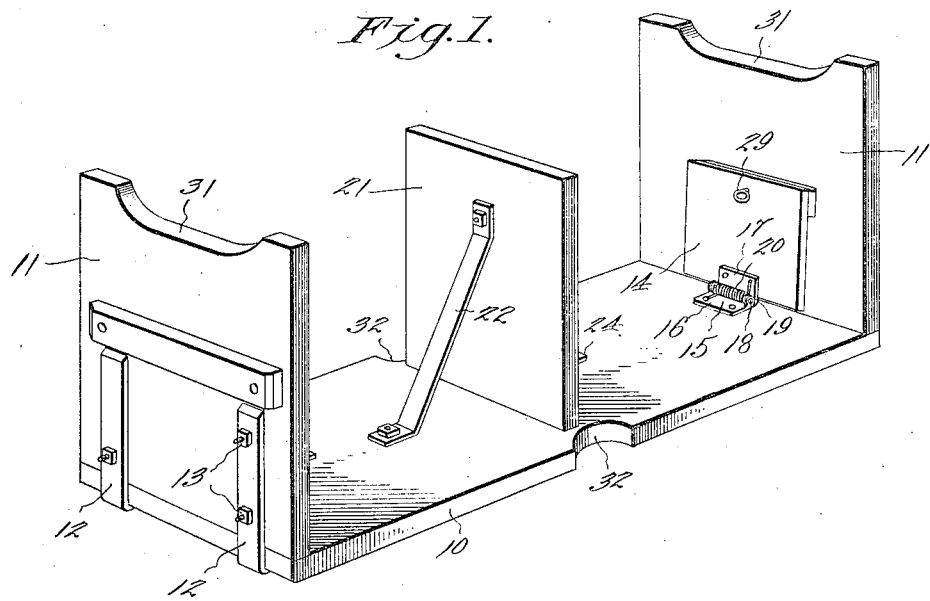
Figure 1 is a perspective view of a box making machine embodying the present invention.

Referring to the drawings in detail wherein like characters of reference denote corresponding parts, the base of the machine is shown at 10 and the end standards thereof at 11. The base 10 is preferably of rectangular formation, so as to provide proper relative length and width for the finished crate.

The end standards 11 are rigidly secured to the crate by means of angle braces 12, one arm of which is bolted or otherwise secured to the end standard 11 as shown at 13, while the other arm is similarly secured beneath the base 10 so as to rigidly hold the said standards 11 in a position substantially at right angles to the base.

Hingedly secured to the base adjacent each of the end standards 11, but spaced therefrom are clamping members 14 each of the said clamping members being adapted to normally engage the inner face of the end standards 11 and to be held yieldingly in such engagement. This is accomplished through the medium of the hinges 15, one member 16 of which is secured to the base 10, the other member 17 being secured to the clamp 14. The members 16 and 17 are pivoted together by means of the hinge pin 18, which is adapted to pass through ears 19 provided upon each end of the members 16 and 17, and surrounding this pin, between these ears, is a coil spring 20, the opposite ends of which are engaged with the members 16 and 17 to normally urge the clamp against the standard 11.

The base 10 is also provided with a center standard 21, which is secured to the said base and braced by means of a rod or bracket 22, the bracket being of such formation as to keep the standard 21 at a substantial right angle with respect to the base 10.

A clamp 23, similar to the clamps 14, is mounted for contact at one face of the standard 21, the manner of mounting being similar to that of the clamps before mentioned, that is, through the medium of the spring hinge 24, the only difference being that one member 25 of this hinge is longer and of slightly different formation, so as to be secured at an approximate central point of the clamp 23, whose size is relatively greater than the clamps 14.

The upper inner edges of the clamps 14 are provided with a cleat 26, which is adapted to engage the end pieces 27 of the crate and clamp the same against the inner faces of the standards 11. The contact face of the clamp 23, however, is preferably formed without this cleat, so that the center piece 28 of the crate is clamped between the inner face of this clamp and the adjacent face of the standard 21. The cleat 26 may be entirely dispensed with or all of the clamps may be provided with such cleats.

For the purpose of providing for the convenient operation of the clamps, each of the said clamps 14 and 24 is provided with an operating knob or handle 29, by means of which the said clamps may be moved upon their hinges for the purpose of inserting the crate material or for removing the finished crate therefrom.

Figure 2:
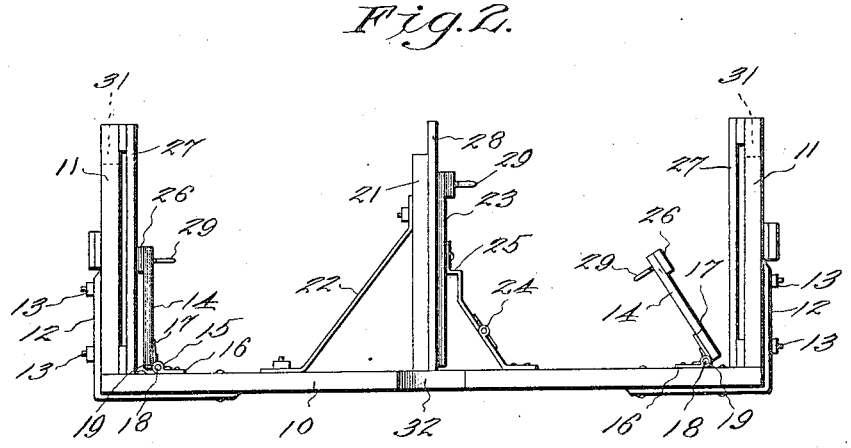
Fig. 2 is a side elevation of the same, the end and center sections of the box or crate being shown in position, one of the clamping members being illustrated in open position for the purpose of showing the manner of inserting and removing the material.

In the operation of the machine, the same is arranged in the position shown, and the clamps are moved from their engagement with the end and center standards to permit of the insertion of the end and center pieces of the crate, as shown in Fig. 2. This arranges these end and center pieces in proper spaced alinement, so that the sides and bottom of the crate may be conveniently attached thereto.

In order to more conveniently insert and remove the end pieces 27, the end standards 11 are cut away as shown at 31, to provide gripping spaces and the base 10 is cut away as shown at 32, so that the operator may more conveniently nail the side strips to the center partition.

Having described the invention, what is claimed is:

A box making machine embodying a base, a standard rigidly secured at each end of said base, a spring actuated clamp hingedly secured to said base adjacent each of the standards, said clamps being secured upon the base in a manner to permit them to assume a position parallel to the standards when in an operative position, a standard rigidly secured to the base intermediate the end standards, a clamp coöperating with the intermediate standard, an inclined brace having one end rigidly secured to the base and its opposite end rigidly secured to the last mentioned clamp and a spring hinge located in said brace intermediate the ends thereof.

In testimony whereof I affix my signature.

ANDREW N. WEIDENBACH.

Copies of this patent may be obtained for five cents each, by addressing the "Commissioner of Patents, Washington, D. C."